United States Patent [19]

David

[11] Patent Number: 4,468,834
[45] Date of Patent: Sep. 4, 1984

[54] CLEANING APPARATUS FOR MACHINE SPINDLES

[76] Inventor: Klaus David, Heinrich-Lersch-Strasse 17, Düsseldorf, Fed. Rep. of Germany, D-4000

[21] Appl. No.: 377,427

[22] Filed: May 12, 1982

[30] Foreign Application Priority Data

May 16, 1981 [DE] Fed. Rep. of Germany ....... 3119597

[51] Int. Cl.³ .......................... B08B 1/04; B23Q 11/00
[52] U.S. Cl. ...................................... 15/246; 15/21 R; 15/22 R; 15/97 R; 15/88; 15/104.1 R; 15/182
[58] Field of Search ................... 15/21 R, 21 E, 22 R, 15/23, 24, 56, 88, 97 R, 101, 104.1 R, 160, 182, 246

[56] References Cited

U.S. PATENT DOCUMENTS

| 1,393,663 | 10/1921 | Carver | 15/24 |
| 1,475,079 | 11/1923 | Miller | 15/24 |
| 1,611,874 | 12/1926 | Becker | 15/24 |
| 1,895,532 | 1/1933 | Backstrom | 15/97 R |
| 2,911,665 | 11/1959 | Mackiewicz et al. | 15/56 X |
| 3,289,239 | 12/1966 | Diebold et al. | 15/24 X |

FOREIGN PATENT DOCUMENTS 615105 1/1980 Switzerland .......................... 15/160

Primary Examiner—Edward L. Roberts
Attorney, Agent, or Firm—Holman & Stern

[57] ABSTRACT

A cleaning cone with a covering for cleaning the internal taper of the work spindle of a machine tool is rotatably mounted on a mandrel on a supporting body. The cone and the mandrel are relatively movable. The apparatus is detachably secured in the operating position.

9 Claims, 5 Drawing Figures

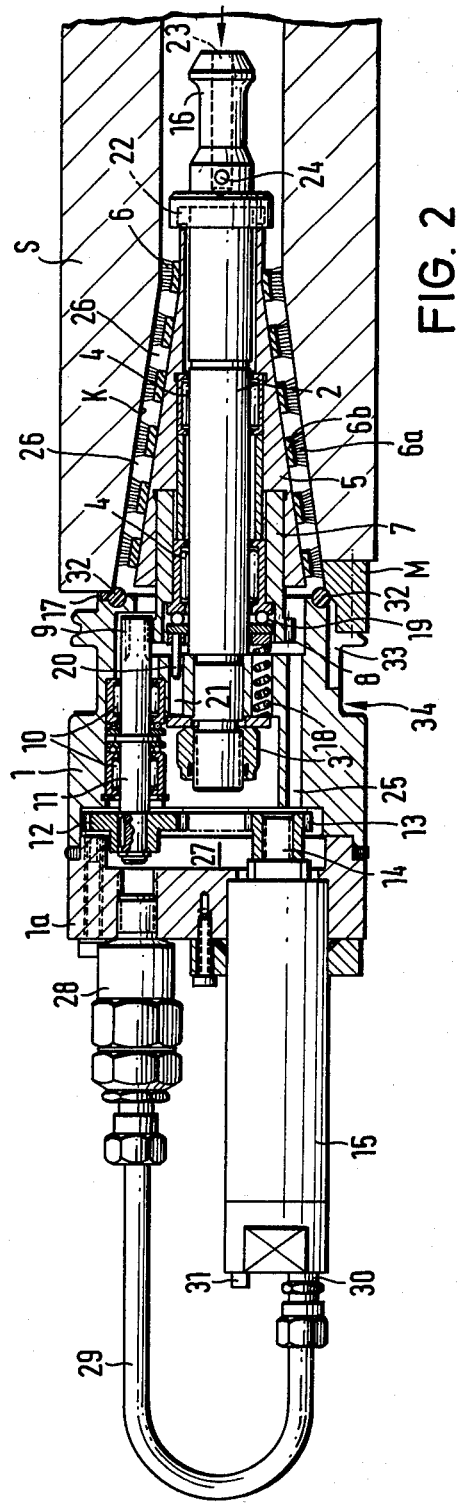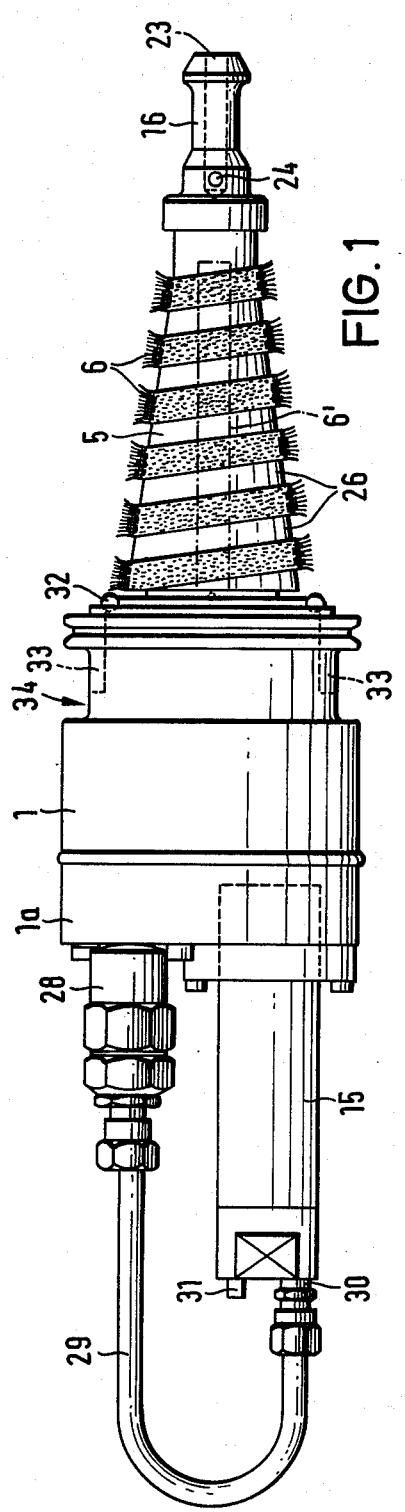

CLEANING APPARATUS FOR MACHINE SPINDLES

BACKGROUND OF THE INVENTION

1. Field of the Invention

The invention relates to an apparatus for cleaning the internal taper of a machine spindle, in particular the work spindle of a machine tool, comprising a cleaning member which may be inserted into the internal taper.

2. Description of the Prior Art

The internal taper of a machine spindle is used to receive a correspondingly tapered part which is to rotate with the spindle in order to perform a specific task. It may, in particular, be a tool, e.g. a boring tool or a milling tool, or, however, another object, for example a sensing instrument, measuring device or the like. The condition of the internal taper of the spindle is of crucial importance for the correct mounting of the tapered portion to be inserted and thus for the accuracy of a machining operation, a measuring procedure or the like to be performed. Even slight impurities can have a highly unfavorable effect.

Hitherto, in order to clean the internal taper, the operator of the machine has simply used a cloth or occasionally a wooden cone which is provided with a covering of leather and which must be manually inserted into the internal taper of the spindle and turned therein. This not only requires time, but also demands caution and skill on the part of the person performing the operation.

BRIEF SUMMARY OF THE INVENTION

The object of the invention is to provide an apparatus for cleaning an internal taper, by means of which at least the cleaning operation itself may be carried out without any manual involvement. In a further aspect the invention aims to construct the apparatus in such a way as to allow the cleaning operation to be carried out completely in an automatic operating sequence. Further tasks associated with this, and to which the invention relates, are disclosed in the description of the solution indicated.

According to the invention the apparatus is provided with a socket-shaped cleaning cone which is rotatably mounted on a mandrel, attachment or the like of a supporting body, and means are provided to effect relative rotation between the cleaning cone and the mandrel, and the apparatus for performing the cleaning operation may be detachably secured to the spindle. The invention aims, in particular, to construct the apparatus in such a way that it may be inserted in an automatic tool-changing system in place of a tool.

There are several possibilities of providing the means for effecting relative rotation between the cleaning cone and the mandrel. In particular, a drive motor may be provided, or there may be a centrifugal mass and/or an outwardly projecting element by means of which the cleaning cone may be prevented from rotating while leaving the mandrel able to rotate.

An apparatus is provided by the invention by means of which the cleaning procedure of an internal taper may be carried out in a particularly favorable manner. The performance no longer depends upon the skill of an operator. Although the insertion of the apparatus into the spindle and the connection thereof to the latter as well as the withdrawal of the apparatus after the cleaning operation may be carried out manually, the invention additionally offers the advantageous possibility of allowing the entire operation including the attachment and the removal of the apparatus to be performed automatically.

The apparatus may be connected to the spindle in various ways depending upon the circumstances, either by means of a high-speed coupling on a principle known per se, by means of a hasp, by means of parts engaging behind projections on the spindle, or by similar means. If the apparatus is to be used with a spindle in which there is a clamping device for detachably securing a tool or the like, the end of the apparatus is advantageously provided with a part cooperating with such a clamping device, for example a clamping mushroom head, as is also the case with tools or other objects to be inserted in the spindle.

The outer covering of the cleaning cone consists of a material which can remove impurities which are present from the internal taper without damaging the surface of the latter. There are various materials which meet this requirement, inter alia suitable synthetic materials. In particular, a covering constructed wholly or in part in the manner of a brush or provided with brushes or similar elements on its surface. This covering may also consist entirely or partially of leather. Irrespective of the particular type or construction, the covering may cover the entire exterior of the cleaning cone or only a part thereof. In one highly advantageous embodiment the covering is band- or strip-shaped. In this connection it may extend in a helical manner. In addition, the covering may comprise parts extending in the direction of the generatrices of the cone or may be formed thereby.

According to a further feature of the invention, apertures for a cleansing medium are provided in the region of the covering of the cleaning cone. These may be formed, in particular, by interspaces between band- or strip-shaped parts of the covering. A gaseous medium, in particular air, may be used as the cleansing medium. The cleansing medium is advantageously fed to the front end of the apparatus, for which purpose an inlet point is provided in this area. This is particularly advantageous when it is possible to supply compressed air through the interior of the spindle, as is also the case for other purposes with large numbers of machines.

A seal suitable for connection to the front end of the machine spindle whose internal taper is to be cleaned may be provided on the supporting body. This ensures that no cleansing medium can escape in an undesirable manner at this point.

In a highly expedient embodiment of the apparatus the cleaning cone is mounted axially displaceably on the mandrel or the like of the supporting body. Even where tolerances are present, this allows the covering supported by the cleaning cone to rest securely against the internal taper. In a further arrangement it may be advantageous if the cleaning cone is subject to the action of at least one spring tending to displace it outwards in the direction of the spindle and comes to rest against the internal taper and a stop is present which limits the path of displacement when the apparatus is withdrawn.

In a highly advantageous embodiment the drive motor of the cleaning cone is a compressed-air motor. The supply of compressed air may be provided from outside. It is particularly expedient to use cleansing air for the cleaning cone as the operating medium for the drive motor.

In addition, it is also possible to provide an electric motor for driving the cleaning cone. It can receive its energy via a line coming from outside. It is particularly advantageous, however, for the supporting body to have a current source for the drive motor, for example a battery or a storage battery, so that in this case too the apparatus forms an independent unit. A contact switch is advantageously provided to switch the drive on and off.

Further details, features and advantages of the invention are disclosed in the following description of examples of embodiments, in the accompanying drawing and in the claims.

BRIEF DESCRIPTION OF THE DRAWINGS

In the drawing

FIG. 1 is an elevational view of one embodiment of the apparatus according to the invention, FIG. 2 is a longitudinal cross-sectional view through the apparatus according to FIG. 1, the section in the upper part being offset through 90° relative to the lower part.

DETAILED DESCRIPTION

Figure 3:
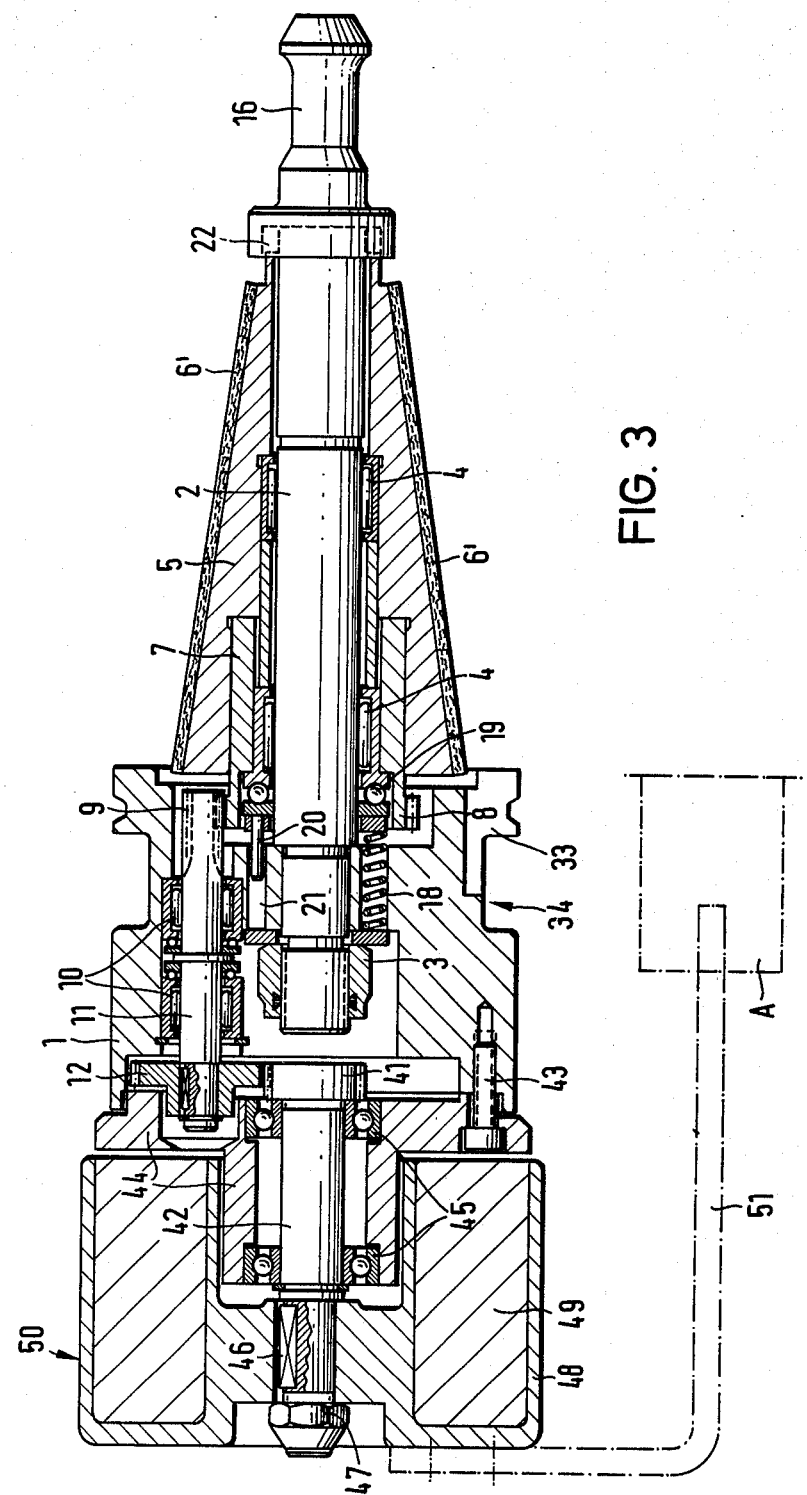
FIG. 3 is a longitudinal cross-sectional view of another embodiment of the apparatus according to the invention.

In order to illustrate the use of the apparatus according to the invention, a work spindle S (e.g. the spindle of a boring and milling machine) with an internal taper K for receiving tools with a corresponding taper is shown in FIG. 2, without, however, a clamping device being shown. The apparatus illustrated comprises a supporting body which comprises a plurality of parts and is designated as a whole by the numeral 1. A mandrel 2 projects out of the said supporting body 1 and is rigidly connected thereto by a self-locking nut 3, so that the supporting body forms a unit with the mandrel. A socket-shaped cone 5, the surface of which is provided with a covering in the form of a helically extending band 6, is rotatably mounted on the mandrel 2 by roller bearings 4 (a sleeve bearing would also be possible). In the embodiment illustrated, the band 6 consists of a brush-like element in the form of a support 6b provided with bristles 6a. The covering may also be formed by bands extending in the direction of the generatrices of the cone or parts of some other shape, as indicated by the numeral 6' in FIG. 1.

The cone 5 is firmly connected to a sleeve 7, the rear part of which is formed as a toothed wheel 8 into which engages the end—formed as a pinion 9—of a shaft 11, which is mounted in the supporting body 1 on roller bearings 10. The other end of the said shaft 11 bears a toothed wheel 12 into which engages a drive pinion 13 mounted on the output shaft 14 of a motor 15. For the sake of clarity, the motor held in the cover part 1a of the supporting body 1 is shown, like other parts, offset through 90°. For this reason the engagement of the pinion 13 in the toothed wheel 12 is indicated by dash-dot lines. It is thus possible to drive the cleaning cone 5 in a rotating manner by the motor 15.

In the embodiment illustrated, the front end of the mandrel 2 is provided with a fixing means constructed as a clampable head 16 such that it can cooperate with a clamping device associated with the spindle S. Clamping devices of this type are known in numerous embodiments, e.g. in horizontal boring and milling machines. In a clamping operation by means of a device of this type, an area on the front face of the supporting body 1 or a ring 17 arranged there comes to rest against the front face of the work spindle S.

A description is given below with reference to FIGS. 4 and 5 of a clamping apparatus known per se, which may also be used in conjunction with the apparatus according to the invention. A guide bushing 61 is disposed in a bore 60 in the spindle S of a machine tool, for example a boring and milling machine or an NC machining center, and is supported at its front end (on the left in FIGS. 4 and 5) on a shoulder 62 of the bore 60. A spring 63, in particular a set of cup springs, bears against its rear end. In the region of its front end the inner face of the guide bushing 61 is provided with an opening 64 formed by an oblique surface 65 and a cylindrical surface adjoining it.

A sleeve 66, which is open at its end face and is secured at its rear end to a rod 67, is displaceable in the guide bushing 61. Radial bores, in which spheres 68 are received, are formed in the wall of the sleeve 66. Only two of these spheres are visible in the drawing. There may be a greater number of balls distributed over the periphery.

A fixed collar 69, against which the rear end of the spring 63 bears, is mounted on the rod 67 in the region of its rear end. By means of an actuating element not shown in the drawing and which can exert an axial force, mechanically or hydraulically for example, in the direction of the arrow F in FIG. 4 so that it presses against the rear end face 70 of the rod 67, the said rod 67 is displaced against the force of the spring 63 (towards the left in the drawing). If the actuating element is retracted, thus releasing the rod 67, the spring 63 pushes the rod 67 back again (towards the right in the drawing).

Figure 4:
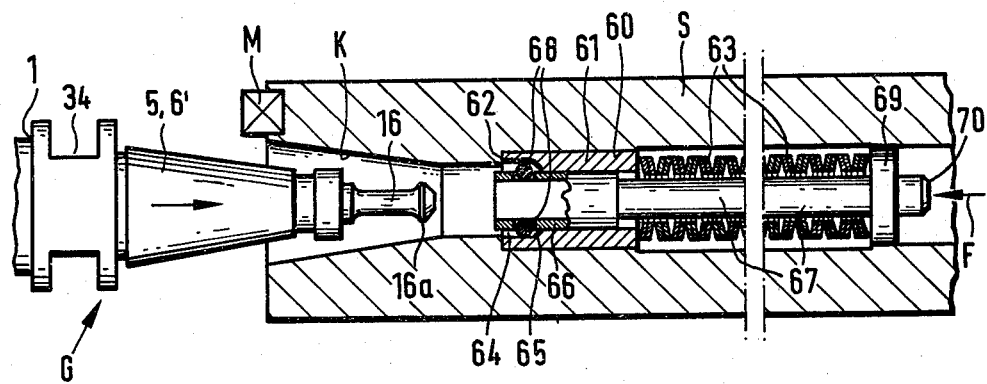
FIG. 4 is a longitudinal cross-sectional view through the end of the spindle shown in FIG. 2 showing a clamping device therein and schematically showing the apparatus of FIGS. 1 and 2 in position prior to engagement with the clamping device.
Figure 5:
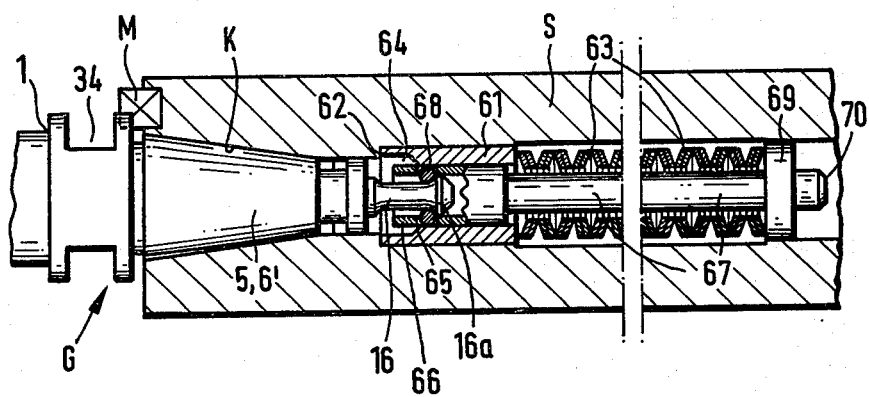
FIG. 5 is a view similar to FIG. 4 showing the apparatus of FIGS. 1 and 2 inserted and engaged by the clamping device.

In FIGS. 4 and 5 the same reference numerals as in the other Figures of the application are used to indicate corresponding parts.

A clamping operation will now be described. In the position illustrated in FIG. 4, the rod 67 and with it the sleeve 66 are pushed forwards, so that the spring 63 is compressed and the spheres 68 can enter the enlargement 64 of the guide bush 61. The apparatus according to the invention designated as a whole by the letter G may now be introduced into the spindle S, in particular by means of the gripper of an automatic tool-changing apparatus associated with the machine. In the process the pull stud 16 projecting from the apparatus enters the sleeve 66 until the collar 16a of stud 16 is in position behind the spheres 68. If the rod 67 is now released by the actuating element (not shown), it is moved backwards (towards the right in FIG. 5) by the force of the spring 63, and the spheres 68 are pressed inwards by the oblique surfaces 65 on the guide bushing 61 and engage behind the collar 16a of the stud 16, so that the latter is gripped and the apparatus G is held in the operating position in the spindle. The release is performed in the reverse direction, so that the parts are positioned in accordance with FIG. 4 and the apparatus G may be retracted from the spindle S.

Such a clamping apparatus is known for tools and is advantageously used with machine tools with automatic tool changing. Since the apparatus according to the invention is provided with suitable means for clamping or securing, it may be inserted just like a tool into the spindle with the aid of an automatic tool-changing apparatus, held in the said spindle during its operation therein and subsequently withdrawn again.

In this operating position of the apparatus the covering 6 of the cleaning cone 5 rests against the internal taper K, so that when the cone is rotated by the motor 15 the entire surface of the cone is swept over and cleaned of impurities.

In the case of the example of embodiment illustrated, in an additional arrangement of the apparatus the cleaning cone 5 is axially displaceable to a limited extent on the mandrel 2 in addition to being rotatably mounted thereon. According to an advantageous feature it is subjected to the action of a plurality of compression springs 18 which are accommodated in the supporting body 1 and arranged distributed around the mandrel 2; only one of the springs 18 is shown in FIG. 2. The compression springs act upon the sleeve 7 or a ring bearing resting thereon by way of a thrust bearing 19. One or more pins 20, which engage in bores 21 in the supporting body, prevent (relative) rotation. The axial path of displacement of the cleaning cone 5 upon the mandrel 2 is limited towards the front by a stop 22.

In the embodiment of the apparatus illustrated, the cleaning action is further reinforced by the fact that air is used as the cleansing medium. It is provided that, when the apparatus is clamped in, compressed air, which in the case of numerous machines is available at a point inside the work spindle, enters an opening 23 on the front face of the head 16 in the direction of the arrow shown in FIG. 2, via the clamping device (not shown), and reaches the space between the internal taper K of the spindle S and the cleaning cone 5 through one or more bores 24 and the gap around the stop 22. It can then pass through the openings 26 which remain between the helically arranged covering 6 and likewise extend helically, and subsequently reaches an inner space 27 in the supporting body 1 through bores 25 in the latter. If the motor 15 is constructed as an air motor, as is the case in this example of embodiment, it may be fed with the cleansing air directly, so that no special air supply to the motor from the outside is necessary. The air passes from the inner space 27 via a filter 28 and a pipe 29 to the inlet 30 of the motor 15. The spent air of the latter may flow out of an outlet 31. In order to ensure that the entire quantity of the cleansing air reaches the motor 15, a sealing ring 32, which comes to rest against the front end of the work spindle S, is advantageously provided on the front face of the supporting body 1, as may be seen in FIG. 2. The abutment of the sealing ring 32 against an entrainment block M, which is arranged on a work spindle in a conventional manner and engages in grooves in a tool body, is also shown. The inside of the entrainment block M advantageously matches the contour of the internal taper K. The supporting body 1 is provided, just as in the case of corresponding tools, with recesses 33 into which the entrainment blocks may engage.

Instead of an air motor another drive may also be provided for the cleaning cone, in particular a small electric motor which is then secured to the supporting body 1 in an appropriate manner. A battery or the like disposed on or in the supporting body is then advantageously provided for providing the said electric motor with current. If cleansing with air or another medium is provided, where appropriate the seal 32 may be dispensed with, so that the air may escape immediately at the front end of the spindle.

The apparatus is advantageously provided with a switch, in particular a contact switch, which is arranged in such a way that when the apparatus is inserted into the spindle the electric motor is switched on as a drive for the cleaning cone and when the apparatus is removed from the spindle the electric motor is switched off. A switch of this type, could cooperate with the front face of the respective spindle.

The entire apparatus is constructed in such a way that it may occupy a position in a magazine of an automatic tool-changing apparatus in place of a tool and may be inserted in the spindle of the respective machine instead of a tool and removed again from the spindle and conveyed back to the store room. In this way the supporting body 1 is provided with an annular groove 34 on which the tongs or the gripper of a delivery device of a tool changer can engage. In addition, there may be codings of a type known per se. In any case, even with position coding, it is advantageously possible to insert the cleaning apparatus automatically into the spindle at a selected moment and to clean the internal taper thereof. This may be provided at a specific point in a computer operation and, where appropriate, may also be carried out at any desired moment upon an additional command.

FIG. 3 illustrates an embodiment of the apparatus which does not contain a motor, but permits rotation of the cleaning cone 5 in a different way. As in the embodiment according to FIG. 2 the cleaning cone 5 is mounted rotatably on the mandrel 2 and is also axially displaceable on the latter to a limited extent. Parts which correspond to or are similar to the embodiment according to FIG. 2 are designated in FIG. 3 with the same reference numerals as in FIG. 2. The corresponding explanations relating to FIG. 2 thus also apply here.

The covering of the cleaning cone 5 is formed by strips 6' of a suitable material which extend in the direction of the generatrices (cf. also FIG. 1).

A toothed wheel 41, which is securely mounted on the end of a shaft 42, engages with the toothed wheel 12 of the drive. The said shaft 42 is mounted centrally on ball bearings 45 in a bearing flange 44 connected to the supporting body 1 by screws 43. A centrifugal mass 50 is secured rotationally rigidly, but detachably, to the other end of the shaft 42 by means of a spline 46 and a self-locking nut 47. The centrifugal mass 50 comprises a casing 48 with a filling 49 of a heavy material, e.g. lead.

An air connection is not necessary in this embodiment. The desired relative movement between the cleaning cone 5 and the machine spindle receiving the apparatus is effected in this case by retarding or accelerating respectively the centrifugal mass 50 by rotating the machine spindle.

The apparatus is removed from a magazine with the aid of a conventional tool-changing device for example and is inserted into the internal taper of the machine spindle (cf. also FIG. 2). While the tool-changing device fetches the next tool for machining from the magazine, the work spindle is briefly rotated and at once braked or stopped again, which may be carried out automatically in the context of the tool-changing operation. When the machine spindle starts to revolve, the centrifugal mass 50 at first lags behind in the rotational movement on account of its inertia and is only gradually accelerated. When the work spindle is stopped, the centrifugal mass 50 continues to revolve, however, until it comes to rest. Such a retarded and lagging rotation of the centrifugal mass 50 produces, by way of the gearing 41, 12, 11, 9 and 8, a relative movement between the cleaning cone 5 and the internal taper of the work spindle and therefore effects the cleaning procedure by means of the covering 6' on the cleaning cone 5. In the advantageous embodiment illustrated the gearing 8, 9, 11, 12, 41 is stepped down. Other embodiments are also possible, however, for example a 1:1 transmission or higher.

Departing from the embodiment according to FIG. 3, it is also possible according to the invention for the centrifugal mass to be directly connected to a cleaning cone 5 or even to be formed by the latter. In the latter case the cleaning cone is constructed suitably heavily.

A further embodiment of the apparatus lies in the fact that an outwardly projecting lever 51 is provided which is connected to the cleaning cone 5 directly or by way of a gear system or other intermediate members in such a way that when this lever 51 is held stationary the cleaning cone 5 is also prevented from rotating. The retention of the lever 51 is expediently effected by its coming to bear against a fixed stop A which is disposed for example on the machine part, such a spindle casing or the like, containing the machine spindle, or at any other suitable point. The lever 51 may also be constructed and arranged in such a way that it may give way or be resilient in a different direction from the direction of the stop.

In FIG. 3 the lever 51 is shown as being secured to the casing 48 of the centrifugal mass 50 purely for the sake of simplicity of representation. No centrifugal mass need be provided, however, but the lever 51 may be secured to any suitable part of the apparatus which is directly or indirectly connected to the cleaning cone 5, i.e. for example on the shaft 42 or on any gear member, such as a toothed wheel, toothed ring or the like.

In using the apparatus, it is sufficient, when this is inserted into a work spindle, for the spindle to be briefly rotated. Since the cleaning cone 5 is held firmly by the lever 51 and thus remains stationary relative to the mandrel 2 rotating with the spindle, relative movement takes place between the cleaning cone 5 and the internal taper of the spindle, as a result of which the said internal taper is cleaned.

Irrespective of the embodiment of the apparatus in other respects, the cleaning cone 5 according to the invention may also be provided with a covering in the form of individual elements held or mounted movably, instead of with a fixed covering. In this way, small cylindrical, conical or spherical cleaning elements with bristles or another surface suitable for cleaning purposes, which are rotatably mounted on axles held in the cleaning cone, may be provided for example on the periphery of the cleaning cone. It is also possible to move such elements rotatably, e.g. according to the principle of a planetary gear or the like.

All the features mentioned in the above description and illustrated in the drawing should be regarded, both individually and in combination, as coming within the scope of the invention, insofar as the known state of the art permits.

I claim:

1. Apparatus for cleaning the internal taper of a machine spindle of the type having a clamping device therein comprising a truncated cleaning cone, a cleaning covering mounted on said cone, a supporting body, a mandrel fixedly mounted on said supporting body, said cone being rotatably mounted on said mandrel, means for effecting relative rotation between said cone and mandrel, and an extension on the end of said mandrel projecting through the smaller end of said cone and adapted to be cooperatively engageable by said clamping device in the spindle for detachably securing the apparatus on the spindle in the operating position.

2. The apparatus of claim 1, wherein said means for effecting relative rotation between said cone and mandrel comprises a drive motor operatively connected to said cleaning cone for rotating the cleaning cone.

3. The apparatus of claim 2, wherein said drive motor comprises a compressed-air motor.

4. The apparatus of claim 3, and further comprising means for connecting said apparatus to a source of cleansing air and for feeding said air to said cleaning cone, and means for feeding said cleansing air from said cone to said air motor as the operating medium for the drive motor.

5. The apparatus of claim 1, wherein said means for effecting relative rotation between said cone and mandrel comprises a rotatable mass rotatably mounted on said supporting body and operatively connected with said cleaning cone for producing relative rotation between the cleaning cone and the mandrel.

6. The apparatus of claim 1, wherein said means for effecting relative rotation between said cone and mandrel comprises an outwardly projecting stop member operatively connected to said cone and adapted to be engageable with a fixed element so that the cleaning cone is prevented from rotating while leaving the mandrel able to rotate.

7. The apparatus of claim 1, wherein said apparatus is adapted as a unit insertable into an automatic tool-changing system in place of a tool.

8. The apparatus of claim 1, wherein said cleaning cone is mounted axially displaceably on the mandrel.

9. The apparatus of claim 8, and further comprising at least one spring mounted within said body and operatively engaging said cone to resiliently urge said cone axially with respect to said body outwards, and a stop member on said mandrel which limits the path of axial displacement of said cone.

* * * * *